United States Patent
Yabuuchi et al.

[11] Patent Number: 5,367,039
[45] Date of Patent: Nov. 22, 1994

[54] PRODUCTION OF COLORED VINYL POLYMER PARTICLES BY POLYMERIZING A VINYL POLYMERIZABLE MONOMER WITH A POLYMERIZABLE DYE

[75] Inventors: Naoya Yabuuchi, Hirakata; Chikayuki Otsuka, Kadoma; Akio Kashihara, Hirakata, all of Japan

[73] Assignee: Nippon Paint Company, Ltd., Osaka, Japan

[21] Appl. No.: 3,669

[22] Filed: Jan. 12, 1993

Related U.S. Application Data

[63] Continuation of Ser. No. 587,731, Sep. 25, 1990, abandoned, which is a continuation-in-part of Ser. No. 376,028, Jul. 6, 1989, abandoned.

[30] Foreign Application Priority Data

Jul. 6, 1988 [JP] Japan ................... 63-167973

[51] Int. Cl.$^5$ ............... C08F 220/60; C08F 226/02; C08F 2/22; C08F 2/20
[52] U.S. Cl. ................................ 526/284; 526/202
[58] Field of Search .............................. 526/284

[56] References Cited

U.S. PATENT DOCUMENTS 3,637,596  1/1972  Gulbins ..................... 526/304
4,943,617  7/1990  Etzbach ................... 526/329.9

FOREIGN PATENT DOCUMENTS 1407670  9/1975  United Kingdom .
173410  8/1965  U.S.S.R. .

*Primary Examiner*—Christopher Henderson
*Attorney, Agent, or Firm*—Wenderoth, Lind & Ponack

[57] ABSTRACT

Disclosed is a process for preparing a colored polymer without color change between a reactant color dye and an obtained polymer. The process of the present invention comprises polymerizing a vinyl polymerizable monomer (A), and a polymerizable dye (B) prepared by reacting a (meth)acryloyl compound having a group reactive with an active hydrogen, with a dye represented by the formula:

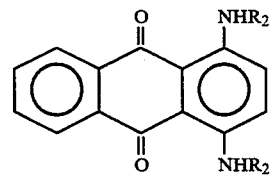

(1)

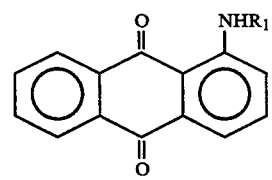

(2)

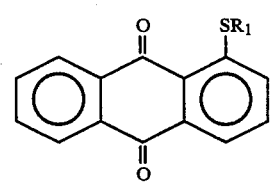

(3)

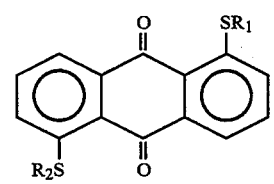

(4)

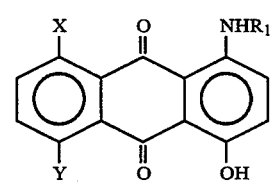

(5)

(Abstract continued on next page.)

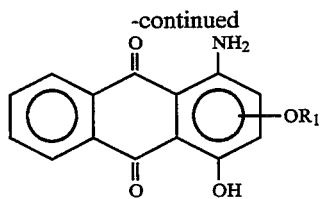

(6)

wherein $R_1$ and $R_2$, which are the same or different, show a hydrogen atom or a group having the formula;

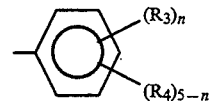

($R_3$ represents —$(CH_2)_m$-$NH_2$, or —$(CH_2)_m$-OH, $R_4$ represents a hydrogen atom, an alkyl group, a cycloalkyl group or an allyl group, n is an integer of 1 to 5 and m is 0 or an integer of 1 to 5), provided that both $R_1$ and $R_2$ do not represents a hydrogen atom, X and Y, which are different, —OH or —$NHR_1$, in the presence of a polymerization initiator, and a color difference between the polymerizable dye and the obtained colored vinyl polymer is within ± 3 nm by absorption spectrum.

5 Claims, No Drawings

PRODUCTION OF COLORED VINYL POLYMER PARTICLES BY POLYMERIZING A VINYL POLYMERIZABLE MONOMER WITH A POLYMERIZABLE DYE

RELATED APPLICATION

The present invention is a continuation of now abandoned application, Ser. No. 07/587,731, filed Sep. 25, 1990, which in turn is a continuation-in-part application based on U.S. patent application Ser. No. 07/376,028, filed Jul. 6, 1989 both applications being abandoned.

FIELD OF THE INVENTION

The present invention relates to a process for preparing colored vinyl polymer which is used for paint, electrophotographic developer, ink and the like.

BACKGROUND OF THE INVENTION

Many attempts to introduce a dye stuff into a polymer structure have been done, in order to enhance color stability and prevent color shading. For example, Japanese Kokai Publication 203107/1986 discloses that a colored polymer is prepared using a complex of an ethylenically unsaturated sulfonic acid and a basic dye as a polymerizable dye. The obtained colored polymer, however, has very poor solubility in organic solvents.

Eur. Polym. J. Vol.23, No.8, pp 617–622, 1987 discloses a colored polymer which is prepared from an anthraquinone dye modified by methacryloyl groups. The colored polymer has not only good solubility in an organic solvent, but also a suitable solubity in water or alcohols. However, color change occurs between the anthraquinone dye and the obtained colored polymer by the function of a polymerization initiator. This makes it very difficult to control or design the color of the polymer.

Russian Patent 173410 discloses that a polymerizable dye, which is obtained by introducing an acryloyl group into aminoanthraquinone, is polymerized with styrene to obtain a colored polystyrene. In this reaction, the color of the aminoanthraquinone changes because of the modification of the chemical construction of a chromophore. The polymerizable dye of the Russian Patent has poor solubility with styrene and therefore imprarts poor color density to the obtained polystyrene.

SUMMARY OF THE INVENTION

The present invention provides a process for preparing a colored polymer without color change between a reactant color dye and an obtained polymer. The process of the present invention comprises polymerizing;

(A) 100 parts by weight of a vinyl polymerizable monomer, and (B) 0.1 to 99.9 parts by weight of a polymerizable dye prepared by reacting a (meth)acryloyl compound having a group reactive with an active hydrogen, with a dye represented by the formula:

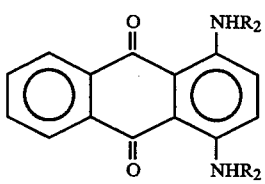

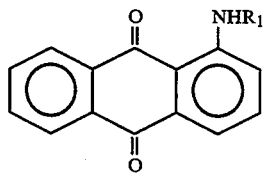

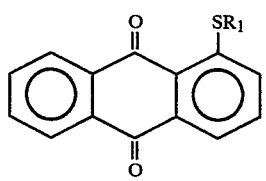

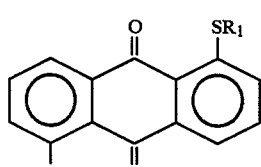

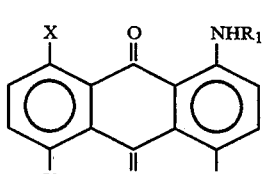

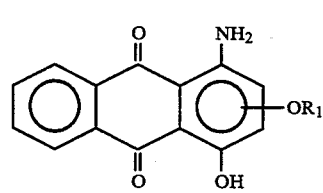

wherein $R_1$ and $R_2$, which are the same or different, show a hydrogen atom or a group having the formula;

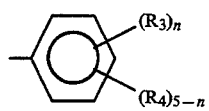

($R_3$ represents —$(CH_2)_m$-$NH_2$, or —$(CH_2)_m$-OH, $R_4$ represents a hydrogen atom, an alkyl group, a cycloalkyl group or an allyl group, n is an integer of 1 to 5 and m is 0 or an integer of 1 to 5), provided that both $R_1$ and $R_2$ do not represents a hydrogen atom, X and Y, which are different, —OH or —$NHR_1$, in the presence of a polymerization initiator, and a color difference between the dye (1) to (6) and the obtained colored vinyl polymer is within ±3 nm by absorption spectrum.

DETAILED DESCRIPTION OF THE INVENTION

The dyes employed in the present invention can be prepared by methods known to the art. In the formula (1), dyes wherein $R_1$ and $R_2$ are

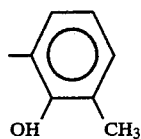

can be prepared by reacting 1,4-diaminoanthraquinone with 2-hydroxy-3-bromotoluene in the presence of sodium acetate and copper. The other dyes represented by the formula (1) can be prepared by similar reactions. The dyes shown by the formula (2) may be prepared using 1-aminoanthraquinone as a starting material, and the dyes of formula (5) may be prepared from 1,5-dihydroxy-4,8-diaminoanthraquinone. The dyes of the formula (3) wherein $R_1$ is

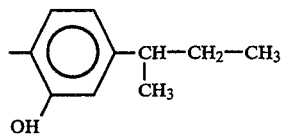

may be prepared by reacting 1-nitroanthraquinone with 2-hydroxy-4-isobutylthiophenol in the presence of KOH. The dyes of the formula (4) may be prepared from 1,5-dinitroanthraquinone as a starting material by the same reaction with the dye of the formula (3).

The (meth)acryloyl compound having a group reactive with an active hydrogen employed in the present invention includes (meth)acryloyl chloride, (meth)acryloyl isocyanate, isocyanatoethyl (meth)acrylate, ethoxalyloxyethyl (meth)acylate, 2-vinylazlactone and the like.

A reaction of the dye (1) to (6) and (meth)acryloyl chloride may be carried out by dissolving the dyes in a suitable solvent followed by adding methacryloyl chloride thereto in the presence of an tertiary amine. The suitable solvent is a solvent other than water and alcohols, preferably a dehydrated solvent. The tertiary amine includes triethylamine, benzyldimethylamine, diazabicyclooctadecane and the like. Quaternary ammonium salts are produced during the dehydrochlorination and can be easily separated by filtration. A reaction of the dye (1) to (6) with (meth)acryloyl isocyanate, isocyanatoethyl (meth)crylate, ethoxalyloxyethyl (meth)acrylate or 2-vinylazlactone takes place by only mixing the both.

The selection of methacryloyl chloride, methacryloyl isocyanate and isocyanatoethyl methacrylate is done depending upon the sort of the vinyl polymerizable monomer and solvent. For example, in case where a non-polar monomer, such as styrene and the like, is employed, methacryloyl chloride or ethoxalyloxyethyl (meth)acrylate is preferred because of compatibility with the non-polar monomer. In case where a polar monomer, such as methyl methacrylate, methacrylic acid, acrylamide and the like, is employed, methacryloyl isocyanate, isocyanatoethyl methacrylate or 2-vinylazlactone is preferred.

The vinyl polymerizable monomer (A) of the present invention includes an alkyl (meth)acrylate, such as methyl acrylate, methyl methacrylate, ethyl acrylate, n-butyl acrylate, n-butyl methacrylate, 2-ethlyhexyl acrylate and 2-ethylhexyl methacrylate; a hydroxyl group-containing monomer, such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol; a polymerizable amide, such as acrylamide and methacrylamide; a polymerizable nitrile, such as acrylonitrile and methacrylonitrile; glycidyl (meth)acrylate; an aromatic vinyl compound, such as styrene and vinyl toluene; an alphaolefin, such as ethylene and propylene; a vinyl compound, such as vinyl acetate and vinyl propyonate; a diene compound, such as butadiene and isoprene; a carboxyl group-containing monomer, such as acrylic acid, methacrylic acid, crotonic acid, itaconic acid, maleic acid, fumaric acid, monobutyl itaconate and monobutyl maleate; a phosphoric acid group-containing monomer, such as acidphosphoxyethyl methacrylate, acidphosphoxypropyl methacrylate, 3-chloro-2-acidphosphoxypropyl methacrylate; a sulfonic acid group-containing monomer, such as 2-acrylamide-2-methylpropanesulfonic acid and 2-sulfoethyl methacrylate; a nitrogen-containing alkyl (meth)acrylate, such as dimethylaminoethyl acrylate and diethylaminoethyl methacrylate; and the like.

In addition to the above mentioned vinyl polymerizable monomer, a polyethylenic monomer may be employed to control a glass-transition temperature and a molecular weight of the obtained polymer (see U.S. Pat. No. 4,920,187 corresponding to Japanese Patent Application Ser. No. 277067/1987). The polyethylenic monomer may be present in an amount of 0.2 to 50% by weight based on the total monomer amount. However, amounts of more than 50% by weight can be used.

Generally, a polymerization can be carried out using a polymerization initiator. The initiator is not limited. For solution polymerization and dispersion polymerization, examples of the initiators are an azo compound, such as azobisisobutylonitrile, 2,2-azobis(2,4-dimethylvaleronitrile), 2,2'-azobis(4-methoxy-2,4-dimethylvaleronitrile, dimethyl-2,2'-azobisisobutyrate, a mixture thereof and the like. An amount of the initiator is within the range of 0.1 to 10% by weight, preferably 0.2 to 7% by weight based on the total monomer amount. For emulsion polymerization, an initiator having positive or negative charges is preferably employed. For positive charges, the initiator includes an azo-amidine compound, such as 2,2'-azobis(2-amidinopropane)dihydrochloride, 2,2'-azobis(N,N'-dimethyleneisobutylamidine), 2,2'-azobis(N,N'-dimethyleneisobytylamidine)-dihydrochloride and the like. For negative charges, an azo type carboxyl group-containing compound, such as 4,4'-azobis(4-cyanopentanoic acid) or persulfate, such as potassium persulfate or ammonium persulfate can be employed. Amounts of these initiators are selected depending upon a desired electric charge, but preferably within the range of 0.1 to 10% by weight based on the total monomer amount.

Hitherto, when a radical polymerization is carried out in the presence of a dye, the dye changes its chemical structure and its color by the function of the polymerization initiator. It therefore is difficult to use a polymerization initiator having strong oxidation power. This provides disadvantages in the selection of an initiator or in graft polymerization and therefore makes polymer design difficult. The present invention dissolves the problems mentioned above and an initiator can be widely selected. Accordingly, a desired polymer can be freely designed and produced using many known methods. Especially, the process of the present invention enhances light-resistance and makes easy to form a graft polymer.

The polymerization reaction is radically conducted by, for example solution polymerization, emulsion polymerization, aqueous dispersion polymerization, non-aqueous dispersion polymerization, bulk polymerization and the like. Art known solvent, dispersant, emulsifying agent and the like can be employed. Typical examples of the solvents are aromatic hydrocarbons, such as xylene, toluene and the like; ketones, such as methyl ethyl ketone, methyl isobutyl ketone and the like; ethyleneglycol monoalkyl ethers, such as ethyleneglycol monomethyl ether, ethyleneglycol monobutyl ether and the like; alcohols, such as ethanol, isopropyl alcohol and the like. Typical examples of the dispersants are polyvinyl alcohol, partially saponified polyvinyl alcohol, gelatin, celluloses, tribasic calcium phosphate and the like. The polymerization temperature is generally 40° to 160° C.

The polymerizable dye of the present invention can be used in an amount of 0.1 to 99.9 parts by weight based on 100 parts by weight of the vinyl polymerizable monomer.

According to the present invention, since a (meth)acryloyl group is not directly introduced into an anthraquinone ring, but introduced through a phenyl group or a substituted phenyl group, the (meth)acryloyl group is easily introduced into the anthraquinone dye and no color change of the dye occurs. In addition, the obtained polymerizable dye does not change its color during radical polymerization reactions, i.e. an absorption spectrum change of within ±3 nm. The dye also has high solubility with a vinyl monomer and therefore impart high color density to the obtained polymer. The polymerizable dye is easily copolymerized with any vinyl monomer and the obtained polymer does not show color bleeding. An initiator can be widely selected and a desired polymer can be freely designed by the present invention. The colored vinyl polymer obtained by the present invention is very suitable for paint, toner, ink, medical polymer, carriers for medicines, a biosensor, an optical sensor, molding resin and the like.

EXAMPLES

The present invention is illustrated by the following examples which, however, are not construed as limiting the present invention to their details. The reaction was carried out in a two liter flask equipped with a condenser, a thermostat, a nitrogen inlet, a raw material inlet and a stirrer.

EXAMPLE 1

The following ingredients were charged in the reaction flask;

| Ingredient | Parts by weight (g) |
| --- | --- |
| An yellow dye | 100 |
| 1,4-Dioxane | 1,300 |
| Triethylamine | 47.05 |

Then, 39.12 g (1.1 equivalent) of methacryloyl chloride and 160 g of 1,4-dioxane were added dropwise to the reaction flask at room temperature for about 60 minutes. The reaction was followed by thin-layer chromatography and, after the completion of the reaction, 10 ml of methanol was added to consume methacryloyl chloride. Produced quaternary ammonium salt was separated by filtration from the reaction mixture and the filtrate was subjected to an evaporation to remove the solvent. The resultant solid was recrystallized with methanol and separated by filtration to obtain a polymerizable dye having the following formula.

Its chemical structure was determined by IR, NMR, mass spectrum and liquid chromatography. An yield was 92%. A peak wave length by absorption spectrum was 421 nm.

EXAMPLES 2 TO 8

The ingredients shown in Table 1 were employed and reacted as generally described in Example 1 to obtain polymerizable dyes.

TABLE 1

| Ex. No. | Dye | Solvent | Amino | Polymerizable group-containing Compound | Solvent | λ max (nm) Product |
| --- | --- | --- | --- | --- | --- | --- |
| 2 | 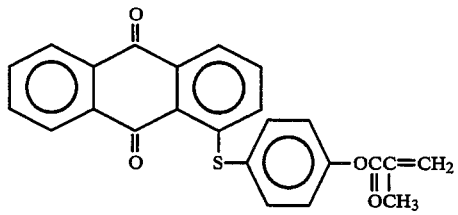 116.9 g | Dichloromethane 1400 g | Triethylamine 63.66 g | Methacryloyl-chloride 36.69 g | Dichloromethane 100 g | 544 |

TABLE 1-continued

| Ex. No. | Dye | Solvent | Amino | Polymerizable group-containing Compound | Solvent | λ max (nm) Product |
|---|---|---|---|---|---|---|
| 3 | 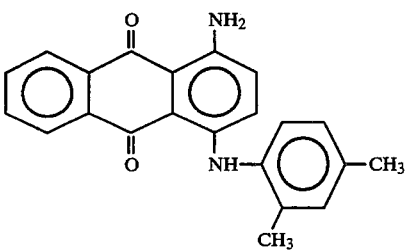 107.8 g | 1,4-dioxane 1200 g | — | Methacryloyl isocyanate 35.57 g | 1,4-dioxanel 150 g | 644 |
| 4 | 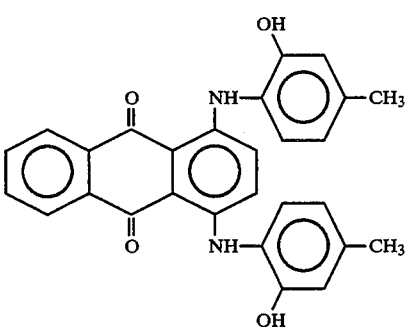 141.8 g | Toluene 1400 g | — | Isocyanato-ethyl 39.44 g | Toluene 150 g | 662 |
| 5 | 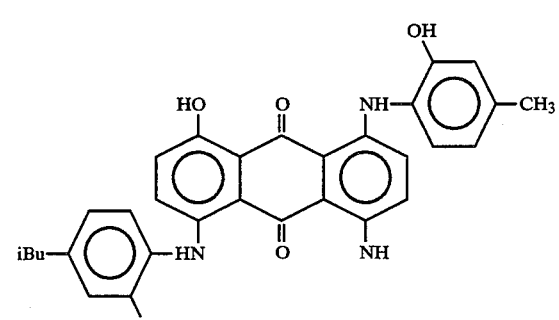 179.0 g | Dichloromethane 1600 g | Benzyldimetylamine 87.34 g | Methacryloyl-chloride 36.99 g | Dichloromethane 150 g | 656 |
| 6 | 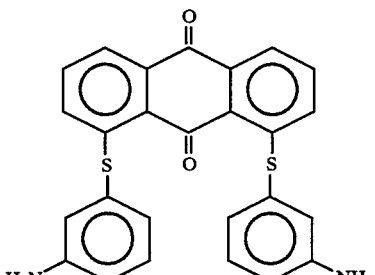 100 g | 1,4-dioxane 1200 g | Tryethylamine 66.41 g | Methacryloyl-chloride 50.15 g | 1,4-dioxane 300 g | 438 |
| 7 | 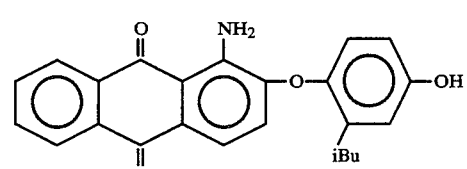 100 g | Chloroform 1400 g | Tryethylamine 56.43 g | Methacryloyl-chloride 36.23 g | Chloroform 200 g | 542 |

| Example 8 | |
|---|---|
| Ingredients | Parts by weight (g) |
| Butyl acetate | 160 |
| Xylene | 120 |
| Styrene | 900 |
| n-Butyl methacrylate | 260 |
| The polymerizable dye of Ex. 1 | 120 |

The above ingredients were charged in the reaction flask and heated to 75° C. A mixture of 10 g of azobisisobutylonirile and 40 g of xylene was added dropwise for about 120 minutes and reacted for another 6 hours. It was then evaporated under a reduced pressure to remove the solvent and ground after cooling.

A portion of the obtained polymer was subjected to a measurement of absorption spectrum to find no change in spectrum. The polymer had Mw=69,000 and Mn=24,000 by GPC.

| Example 9 | |
|---|---|
| Ingredients | Parts by weight (g) |
| Deionized water | 800 |
| PVA-217[1] | 8 |
| PVA-205[2] | 2 |
| Perex OT-P[3] | 0.2 |
| Potassium iodide | 0.04 |

[1] a polyvinyl alcohol having a degree of polymerization of 1,700 available from Kuraray Co., Ltd.
[2] a polyvinyl alcohol having a degree of polymerization of 500 available from Kuraray Co., Ltd.
[3] An anionic surfactant available from Kao Corp.

The above ingredients were charged in the reaction flask and heated to 70° C. A mixture of 280 g of styrene, 80 g of 2-ethylhexyl acrylate, 40 g of the polymerizable dye of Example 2 and 16 g of lauroyl peroxide was added dropwise and reacted for 8 hours. It was then steam distilled to remove unreacted monomer and separated to dry.

A portion of the obtained polymer was subjected to a measument of absorption spectrum to find no change in spectrum. The polymer had Mw=61,700 and Mn=20,400 by GPC.

Example 10

A polymer was prepared as generally described in Example 9, with the exception that the polymerizable dye of Example 3 was employed instead of that of Example 2.

A portion of the obtained polymer was subjected to a measurement of absorption spectrum to find no change in spectrum. The polymer had Mw=57,700 and Mn=18,500 by GPC.

The polymers obtained in Examples 8 to 10 were very suitable for toner.

| Example 11 | |
|---|---|
| Ingredients | Parts by weight (g) |
| Deionized water | 1200 |
| Perex CS[4] | 14.4 |
| Poise 520[5] | 0.24 |
| Copper sulfate | 0.24 |
| Potassium peroxide | 12.0 |
| Styrene | 300 |

[4] An anionic surfactant available from Kao Corp.
[5] A nonionic surfactant available from Kao Corp.

The above ingredients were charged in the reaction flask and heated to 50° C. It was polymerized at 50° C. for 6 hours and further reacted at 70° C. for 18 hours. After screening with 400 mesh sieve, the obtained polymer was purified by ultrafiltration. The polymer had a particle size of 4.1 micrometer and a variation coefficient of 4.5% by a coulter counter.

| Ingredients | Parts by weight (g) |
|---|---|
| The latex obtained above | 100 |
| | (solid content 20 g) |
| Deionized water | 1200 |
| Perex TR[6] | 0.24 |
| Perex OT-P | 2.40 |
| PVA-203[7] | 3.20 |
| PVA-217 | 0.24 |
| Potassium iodide | 0.06 |

[6] An anionic surfactant available from Kao Corp.
[7] A polyvinyl alcohol having a degree of polymerization of 300 available from Kuraray Co., Ltd.

The above ingredients were charged in the reaction flask and a mixture of 10.0 g of styrene and 0.6 g of benzoyl peroxide was added and mixed for 24 hours. Next, 16.0 g of the polymerizable dye of Example 4, 32.0 g of diisopropenylbenzene and 82.0 g of styrene were added and reacted at 75° C. for 3 hours and at 85° C. for 4 hours. The polymer had a particle size of 8.1 micrometer and a variation coefficient of 5.0% by a coulter counter. A portion of the obtained polymer was subjected to a measument of absorption spectrum to find no change in spectrum.

EXAMPLE 12

A polymer was prepared as generally described in Example 11, with the exception that the polymerizable dye of Example 5 was employed.

A portion of the obtained polymer was subjected to a measument of absorption spectrum to find no change in spectrum. The polymer had Mw=13,900 and Mn=6,700 by GPC. The polymer had a particle size of 5.1 micrometer and a variation coefficient of 9.2% by a coulter counter.

The polymers obtained in Example 12 was very suitable for toner.

| Example 13 | |
|---|---|
| Ingredients | Parts by weight (g) |
| Deionized water | 1100 |
| Cetylpiridinium chloride | 12 |

The above ingredients were changed in the reaction flask and heated to 60° C. Then, the following ingredients were added thereto and polymerized for 24 hours.

| Ingredients | Parts by weight (g) |
|---|---|
| Deionized water | 100 |
| V-50 | 2.0 |

On the completion of adding, 40 g of methyl methacrylate, 40 g of ethyl acrylate, 60 g of styrene, 20 g of ethylene glycol dimethacrylate and 40 g of the polymerizable dye of Example 4 were added dropwise using a dropping funnel for about 60 minutes and polymerized for 6 hours. The obtained polymer particles had an average particle size of 0.15 micrometer when measured by a scanning electron microscope. The obtained polymer particles were subjected to a measurement of absorption spectrum to find no change in spectrum.

The colored gel particles are very suitable for ink and colorant.

Example 14

| Ingredients | Parts by weight (g) |
|---|---|
| Isopropanol | 330 |
| Deionized water | 70 |
| Polyvinyl pyrrolidone | 12 |

The above ingredients were charged in the reaction flask and heated to 60° C. Then, the following ingredients were added thereto and polymerized for 24 hours.

| Ingredients | Parts by weight (g) |
|---|---|
| Styrene | 70 |
| 2-Ethylhexyl methacrylate | 20 |
| Lauroyl peroxide | 2.0 |
| V-601[11] | 6.5 |
| The dye of Example 6 | 10 |

[11]An azo initiator available from Wako Junyaku Company.

The obtained yellow polymer particles had a particle size of 5.2 micrometer and a variation coefficient of 13.2% by a coulter counter. The obtained polymer particles were subjected to a measument of absorption spectrum to find no change in spectrum.

Example 15

| Ingredients | Parts by weight (g) |
|---|---|
| t-Butanol | 85 |
| Methanol | 315 |
| Hydroxypropylcellulose | 4.0 |
| Partially saponified polyvinylacetate[12] | 6.0 |

[12]Available from Kuraray Co., Ltd. as X-0945.

The above ingredients were charged in the reaction flask and heated to 60° C. Then, the following ingredients were added thereto and polymerized for 24 hours.

| Ingredients | Parts by weight (g) |
|---|---|
| Styrene | 65 |
| n-butyl acrylate | 20 |
| Dioctanoyl peroxide | 8.0 |
| The dye of Example 7 | 15 |

The obtained yellow polymer particles had a particle size of 8.2 micrometer and a variation coefficient of 9.4% by a coulter counter. The obtained polymer particles were subjected to a measument of absorption spectrum to find no change in spectrum.

The colored particles of Examples 14 and 15 are very suitable for color toner.

EXAMPLE 16

The solubilities with styrene of the polymerizable dyes of Examples 1 to 7 were determined by mixing 100 g of styrene and the polymerizable dye to form a mixture of which a supernatant was sampled and its nonvolatile content is expressed solubility degree.

| Example No. | Solubility degree (%) |
|---|---|
| 1 | 5.5 |
| 2 | 12.2 |
| 3 | 9.6 |
| 4 | 15.3 |
| 5 | Completely dissolved |
| 6 | 11.1 |
| 7 | Completely dissolved |

COMPARATIVE EXAMPLE 1

As generally described in Example 11, a polymer was prepared using the following dye:

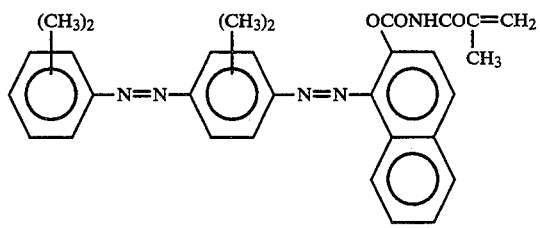

The dye had an absorption peak at 512 nm, while the obtained polymer had an absorption peak at 460 nm, thus color changing from red to orange.

COMPARATIVE EXAMPLE 2

As generally described in Example 11, a polymer was prepared using the following dye:

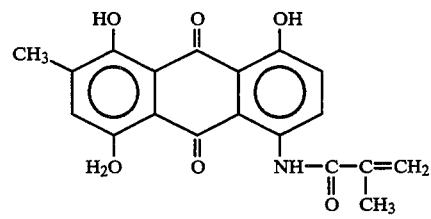

The dye had an absorption peak at 646 nm, while the obtained polymer had an absorption peak at 540 nm, thus color changing from blue to purple.

COMPARATIVE EXAMPLE 3

As generally described in Example 11, a polymer was prepared using the following dye:

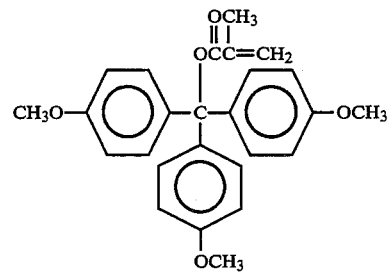

The dye had an absorption peak at 432 nm, while the obtained polymer had an absorption peak at 406 nm, thus color changing from yellow to colorless.

COMPARATIVE EXAMPLE 4

A solubility degree of alpha-acryloylaminoanthraquinone which is described in Russian Patent 173410 was determined as generally described in Example 16 to find 0.4% which is very poor in comparison with the polymerizable dye of the present invention.

What is claimed is:

1. A process for preparing colored vinyl polymer particles which comprises suspension-polymerizing, dispersion-polymerizing or emulsion polymerizing:
   (A) 100 parts by weight of a vinyl polymerizable monomer, and
   (B) 0.1 to 99.9 parts by weight of a polymerizable dye prepared by reacting a (meth)acryloyl compound having a group reactive with an active hydrogen selected from the group consisting of (meth)acryloyl chloride, (meth)acryloyl isocyanate, isocyanatoethyl (meth)acrylate, ethoxalyloxyethyl (meth)acrylate and 2-vinylazlactone, with a dye represented by the formula:

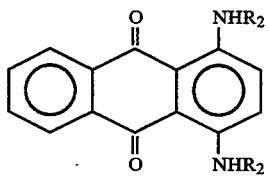 (1)

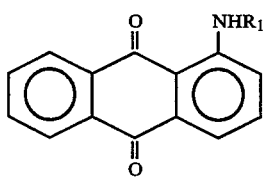 (2)

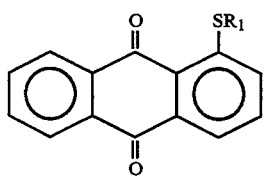 (3)

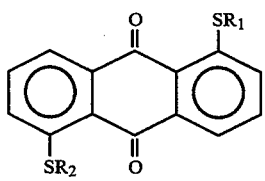 (4)

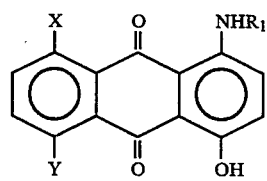 (5)

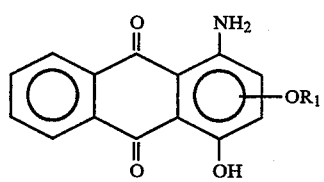 (6)

wherein $R_1$ and $R_2$, which are the same or different, represent a group having the formula:

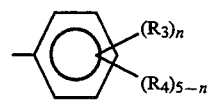

wherein $R_3$ represents $-(CH_2)_m-NH_2$, or $[-(CH_2),-OH]-(CH_2)_m-OH$, $R_4$ represents a hydrogen atom, an alkyl group, a cycloalkyl group or an allyl group, n is an integer of 1 to 5 and m is 0 or an integer of 1 to 5, and X and Y, which are different, represent $-OH$ or $-NHR_1$, in the presence of a polymerization initiator, and a color difference between the dye (1) to (6) and the obtained colored vinyl polymer particles is within ±3nm as measured by absorption spectrum.

2. The process according to claim 1 wherein a reaction of the dye (1) to (6) and (meth)acryloyl chloride is carried out by dissolving the dyes in a suitable solvent followed by adding (meth)acryloyl chloride thereto in the presence of an tertiary amine.

3. The process according to claim 2 wherein said tertiary amine includes triethylamine, benzyldimethylamine or diazabicyclooctadecane.

4. The process according to claim 1 wherein a reaction of the dye (1) to (6) with (meth)acryloyl isocyanate, isocyanatoethyl (meth)acrylate, ethoxalyloxyethyl (meth)acrylate or 2-vinylazlactone takes place by simply mixing the both.

5. The process according to claim 1 wherein said polymerization initiator includes an azo compound and a peroxide.

* * * * *